United States Patent
Moriwaki et al.

(10) Patent No.: US 7,711,997 B2
(45) Date of Patent: May 4, 2010

(54) METHOD OF CONTROLLING A TRANSCEIVER MODULE

(75) Inventors: Shohei Moriwaki, Tokyo (JP); Yoshifumi Azekawa, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 44 days.

(21) Appl. No.: 12/261,477

(22) Filed: Oct. 30, 2008

(65) Prior Publication Data

US 2009/0063910 A1 Mar. 5, 2009

Related U.S. Application Data

(63) Continuation of application No. 11/169,656, filed on Jun. 30, 2005, now abandoned.

(30) Foreign Application Priority Data

Sep. 29, 2004 (JP) ............................ 2004-284417

(51) Int. Cl.
  *G06F 11/00* (2006.01)
  *G01R 31/28* (2006.01)
(52) U.S. Cl. ......................... 714/712; 714/6
(58) Field of Classification Search ................ 714/712, 714/6
  See application file for complete search history.

(56) References Cited

U.S. PATENT DOCUMENTS

| | | | |
|---|---|---|---|
| 6,473,871 B1 * | 10/2002 | Coyle et al. ................. | 714/715 |
| 6,826,658 B1 * | 11/2004 | Gaither et al. ............... | 711/150 |
| 6,880,078 B2 * | 4/2005 | Rabinovich ................... | 713/100 |
| 6,906,426 B2 * | 6/2005 | Sefidvash ..................... | 257/778 |
| 7,093,172 B2 * | 8/2006 | Fan et al. ..................... | 714/716 |
| 7,111,208 B2 * | 9/2006 | Hoang et al. ................. | 714/716 |
| 2006/0067358 A1 * | 3/2006 | Moriwaki et al. ........... | 370/463 |
| 2006/0069905 A1 | 3/2006 | Moriwaki | |

OTHER PUBLICATIONS

"A Cooperation Agreement for 10 Gigabit Ethernet Transceiver Package Issue 3.0", XENPAK MSA Rev 3.0, Sep. 18, 2002, Internet URL:<http://www.xenpak.org/MSA/XENPAK_MSA_R3.0.pdf>, pp. 1-77.

* cited by examiner

Primary Examiner—Joseph D Torres
(74) Attorney, Agent, or Firm—Leydig, Voit & Mayer, Ltd.

(57) ABSTRACT

A method of controlling a transceiver module which includes a physical-layer integrated circuit having a physical-layer register unit, and a control integrated circuit having a control-side register unit. In the method, the physical-layer register unit is emulated by the control-side register unit and the physical-layer integrated circuit is prohibited from generating a first error signal giving notice of detection of a specific error directly to a higher-layer device. A second error signal is output from the physical-layer integrated circuit to the control integrated circuit, giving notice of a high-speed error associated with communication processing and that is detected by the physical-layer integrated circuit. The high-speed error is specified in response to the outputting of the second error signal. A bit is set in the control-side register unit in response to the specifying of a high speed error and the control integrated circuit delivers to the higher-layer device the second error signal.

3 Claims, 3 Drawing Sheets

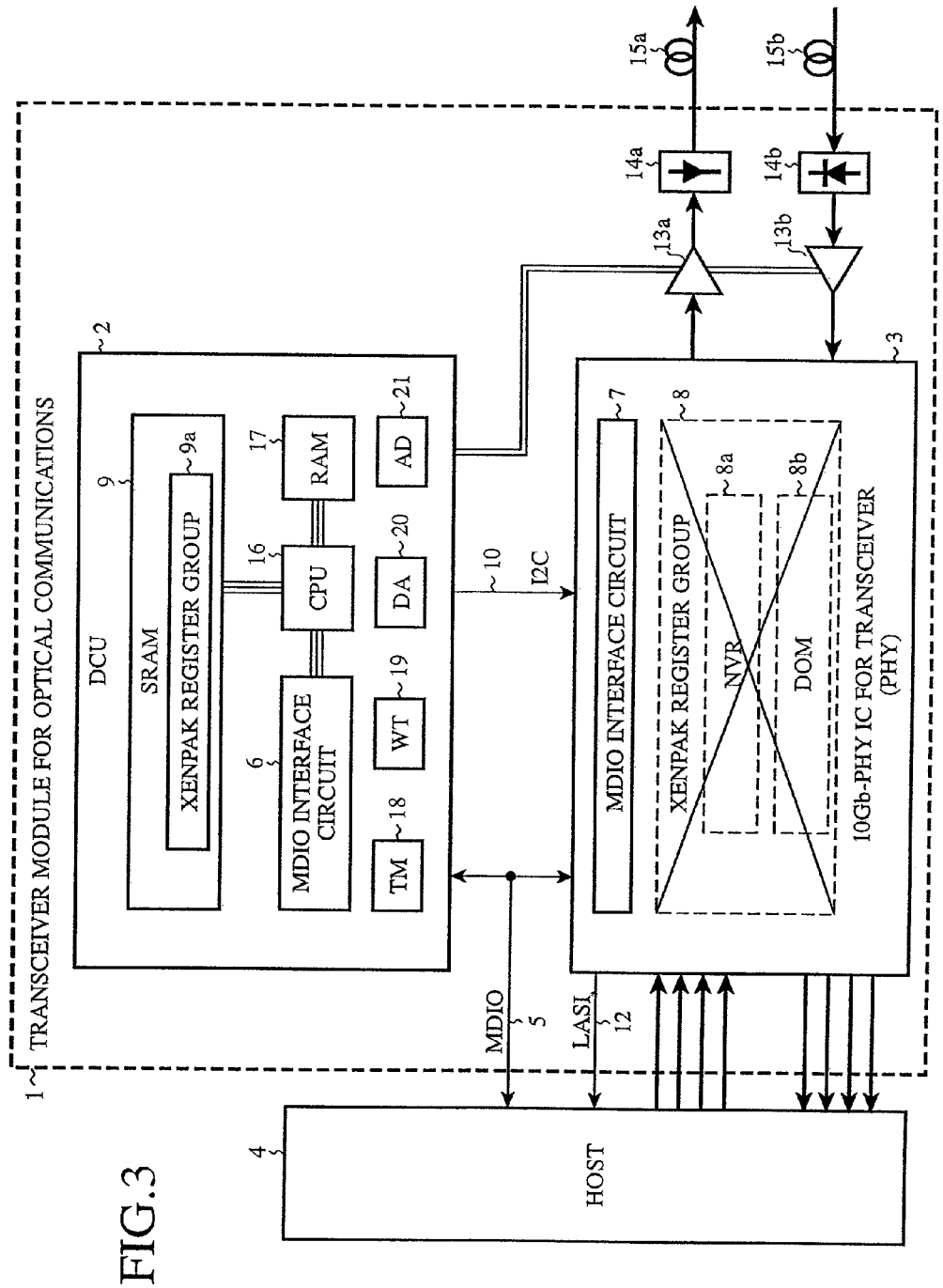

METHOD OF CONTROLLING A TRANSCEIVER MODULE

BACKGROUND OF THE INVENTION

1. Field of the Invention

The present invention relates to a transceiver module for optical communications.

2. Description of Related Art

There have been provided transceiver modules for optical communications which are compliant with the IEEE802.3ae standard, for example. A transceiver compliant with the IEEE802.3ae standard includes, for example, an NV (Non-Volatile) register, a DOM (Digital Optical Monitoring) register, an LASI (Link Alarm Status Interrupt) register, etc. which are XENPAK (common specifications of optical connectors and optical transceivers which operate according to the XAUI (10 Gigabit Attachment Unit Interface) protocol adopted by 10 Gbit Ethernet (registered trademark) defined by the IEEE802.3ae standard) (refer to nonpatent reference 1, for example).

A related art transceiver IC (referred to as a PHY IC from here on) which constitutes such a transceiver module mentioned above has both IEEE registers which are used when carrying out communications processing and XENPAK registers which are defined by the above-mentioned standard, those registers being implemented via hardware. As error-associated registers which belong to those registers, there exist interrelated registers (i.e., LASI_Status registers) holding the same contents in the IEEE registers and XENPAK registers, respectively.

[Nonpatent Reference 1]

"A Cooperation Agreement for 10 Gigabit Ethernet (registered trademark) Transceiver Package Issue3.0", [online], 18 Sep. 2002 and XENPAK, [retrieved on Sep. 17, 2004], Internet URL <http://www.xenpak.org/MSA/XENPAK_MSA_R3.0.pdf>

In the related art transceiver module, when a change is made to the structure and function of either the IEEE registers or the XENPAK registers, it is necessary to perform the design and development of the PHY IC again so that the structure and function of the registers meet new specifications.

On the other hand, when the structure and function of the XENPAK registers which are built in the PHY IC are software-emulated by a device control unit (referred to as a DCU from here on) which is an IC for controlling the PHY IC and other peripheral functions, the structure and function of the XENPAK registers can be changed by changing a software program of the DCU which software-emulates the structure and function of the XENPAK registers.

However, while information about a high-speed error which is detected only by the PHY IC and which is associated with communications processing is stored in one of the XENPAK registers of the PHY IC, to which information about errors can be set, information about a low-speed error which is detected only by the DCU and which is associated with internal processing is stored in one of the XENPAK registers of the PHY IC, to which information about errors can be set. A problem is therefore that a mismatch occurs between the contents of the register for storing error information in the PHY IC and those in the DCU.

SUMMARY OF THE INVENTION

The present invention is made in order to solve the above-mentioned problem, and it is therefore an object of the present invention to provide a transceiver module which, when a DCU emulates registers of a PHY IC, can cancel a mismatch between the contents of the registers in the PHY IC and those in the DCU, which is caused by the occurrence of a high-speed error which is detected only by the PHY IC and occurrence of a low-speed error which is detected only by the DCU.

In accordance with the present invention, there is provided a transceiver module including: a physical-layer integrated circuit having a physical-layer register unit including an error flag register to which a bit value indicating occurrence of an error is set, and an error notification control register to which a bit value indicating whether or not to generate a first error signal for notifying the occurrence of the error to a higher-layer device is set according to a cause of the error; and a control integrated circuit having a control-side register unit which emulates the structure and function of the physical-layer register unit, in which the physical-layer integrated circuit generates a second error signal for notifying the error irrespective of the cause of the error, and outputs the second error signal to the control integrated circuit, and the control integrated circuit specifies the error detected by the physical-layer integrated circuit based on the second error signal and generates the first error signal about this specified error and delivers the first error signal to the higher-layer device, while writing contents of the error flag register of the physical-layer register unit into an error flag register of the control-side register unit.

Since the transceiver module according to the present invention includes the physical-layer integrated circuit having the physical-layer register unit including the error flag register to which a bit value indicating occurrence of an error is set, and the error notification control register to which a bit value indicating whether or not to generate a first error signal for notifying the occurrence of the error to a higher-layer device is set according to a cause of the error, and the control integrated circuit having the control-side register unit which emulates the structure and function of the physical-layer register unit, and the physical-layer integrated circuit generates the second error signal for notifying the error irrespective of the cause of the error, and outputs the second error signal to the control integrated circuit, and the control integrated circuit specifies the error detected by the physical-layer integrated circuit based on the second error signal and generates the first error signal about this specified error and delivers the first error signal to the higher-layer device. Therefore, the present invention offers an advantage of being able to cancel a mismatch between the contents of the registers in the physical-layer integrated circuit and those of the registers in the control integrated circuit, which is caused by both the occurrence of an error (i.e., a high-speed error associated with communications processing) which is detected only by the physical-layer integrated circuit, and the occurrence of an error (i.e., a low-speed error associated with internal processing, such as monitoring of a laser for transmission) which is detected only by the control integrated circuit when the control-side register unit in the control integrated circuit emulates the physical-layer register unit in the physical-layer integrated circuit.

Further objects and advantages of the present invention will be apparent from the following description of the preferred embodiments of the invention as illustrated in the accompanying drawings.

BRIEF DESCRIPTION OF THE DRAWINGS

FIG. 3 is a diagram for explaining the structure of a transceiver module in accordance with embodiment 3 of the present invention, and alarm signal control processing carried out by the transceiver module.

DETAILED DESCRIPTION OF THE PREFERRED EMBODIMENTS

Embodiment 1

Figure 1:
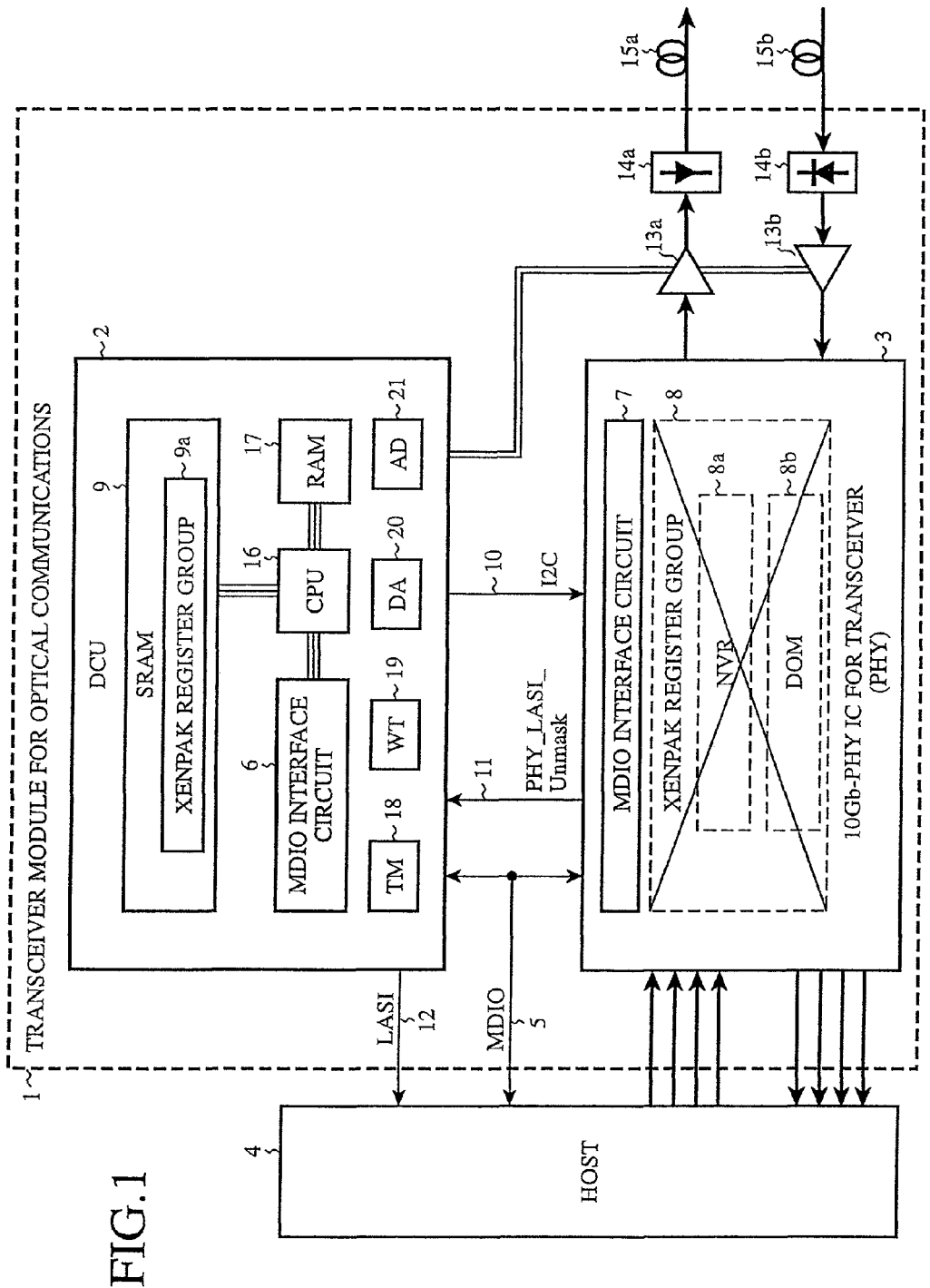
FIG. 1 is a diagram for explaining the structure of a transceiver module in accordance with embodiment 2 of the present invention, and alarm signal control processing carried out by the transceiver module.

FIG. 1 is a diagram for explaining the structure of a transceiver module in accordance with embodiment 1 of the present invention, and alarm signal control processing carried out by the transceiver module, and shows, as an example, an optical-communications transceiver module for 10 G-bit Ethernet (registered trademark) compliant with the IEEE802.3ae standard. The transceiver module 1 for optical communications in accordance with this embodiment is roughly divided into a DCU 2 and a 10 Gb-PHY IC (referred to as a PHY IC from here on) 3 for transceiver.

The DCU (i.e., a control integrated circuit) 2 and PHY IC (i.e., a physical-layer integrated circuit) 3 are connected to each other via a bus 10 for general-purpose serial interface, e.g., an I2C (Inter-Integrated Circuit) serial bus. In the DCU 2 and PHY IC 3, MDIO (Management Data Input/Output) interface circuits 6 and 7 compliant with the IEEE802.3ae establish a communication connection with a host 4 that is a higher-layer device, respectively.

The PHY IC 3 has an XENPAK register group (i.e., a physical-layer register unit) 8 in which an NVR register (referred to as NVR in the figure) 8a, a DOM register 8b, and a LASI register, etc., which are not shown, are disposed, these registers being compliant with the IEEE802.3ae standard, in addition to the MDIO interface circuit 7.

Since the XENPAK register group 8 is software-emulated by the DCU 2, the PHY IC 3 has a mode in which it does not respond accessing of the XENPAK register group 8 by way of the MDIO interface 5 from the host 4. Thereby, when access to the XENPAK registers of the transceiver module 1 from the host 4 is made, a reply output from the PHY IC 3 can be prevented from colliding with a reply output from the DCU 2. In the illustrated example, in order to show that the PHY IC 3 is placed in the mode, the XENPAK register group 8 of the PHY IC is enclosed by a dashed line, and a cross is added to the box of the XENPAK register group.

The DCU 2 includes the MDIO interface circuit 6, an SRAM 9, a CPU 16, a RAM 17, a timer (TM) 18, a watchdog timer (WT) 19, a digital-to-analog converter (DA) 20, and an analog-to-digital converter (AD) 21. An XENPAK register group (i.e., a control-side register unit) 9a having the same structure and function as those of the XENPAK register group 8 of the PHY IC 3 is implemented, via software which the CPU 16 executes, on the SRAM 9. In other words, the software emulates the XENPAK register group 8 of the PHY IC 3 as the XENPAK register group 9a.

The CPU (Central Processing Unit) 16 performs total control of the DCU 2 which is disposed as a microcomputer which embodies operations and peripheral functions. The RAM 17 is used for storing software programs which the CPU 16 executes, a work area, etc. The CPU 16 sets times to the timer 18 and watchdog timer 19, respectively, and controls the whole of the device by performing predetermined operations in response to interrupt requests outputted from the timer 18 and watchdog timer 19.

The transceiver module 1 in accordance with this embodiment is also provided with a laser 14a for transmission, and a light detecting element 14b, and can transmit and receive data to and from outside the transceiver module via optical cables 15a and 15b using the laser and light detecting element. The PHY IC 3 furnishes data to be transmitted to the laser 14a for transmission by way of an amplifier 13a, and the light detecting element 14b furnishes received data to the PHY IC 3 by way of an amplifier 13b.

The DCU 2 monitors the temperature of the laser 14a for transmission, temperature of the transceiver module 1, a bias applied to the laser 14a for transmission, a bias applied to the light detecting element 14b, and a power supply voltage applied to the laser 14a for transmission, for example. The DCU 2 controls the bias applied to the laser 14a for transmission so that the output of the laser 14a for transmission is kept constant.

When detecting an error, the DCU 2 writes digital information (i.e., a bit value specifying the error) indicating the detection of the error into an LASI (Link Alarm Status Interrupt) register which is a component of the XENPAK register group 9a on the SRAM 9 which emulates the XENPAK register group 8. The host 4 reads the contents of this LASI register of the XENPAK register group 9a, and, when determining that it is undesirable that the transceiver module 1 will continue to operate, stops the operation of the transceiver module 1.

To be more specific, when detecting the occurrence of an abnormality, the DCU 2 furnishes an LASI signal (i.e., a first error signal) 12 for warning the host 4 of the occurrence of the error to the host 4. In response to the LASI signal, the host 4 refers to the XENPAK register group 9a of the DCU 2 by way of the MDIO interface 5 and then gets to know that the error has been detected. The LASI signal is a digital signal for specifying the error which is expressed in a form suitable for recognition by the host 4, for example, and which is detected by the transceiver module 1.

In addition to the above-mentioned LASI register to which information indicating whether an error has occurred is set, the PHY IC 3 has an alarm control register (referred to as a PHY_LASI_Control register from here on) (i.e., an error notification control register) to which information indicating whether or not to notify the occurrence of the error to outside the transceiver module according to the cause of the error is set, in each set of the IEEE registers (not shown) and XENPAK registers. Conventionally, even if an error which is ignored by the PHY_LASI_Control register has occurred, the transceiver module does not deliver the LASI signal to any external circuit, such as the host 4.

In contrast, when detecting an error in communication data, the PHY IC 3 in accordance with this embodiment 1 generates an error signal (referred to as a PHY_LASI_Unmask signal from here on) (i.e., a second error signal) 11 for causing the DCU 2 to generate an error signal in response to every error event, and delivers the error signal 11 to the DCU 2 without determining whether or not to deliver the LASI signal to the host 4 under the control of the PHY_LASI_Control register. The PHY_LASI_Unmask signal 11 is a signal having a digital value for notifying and specifying an error detected by the PHY IC 3 irrespective of the contents of the PHY_LASI_Control register, that is, irrespective of the cause of the error, the digital value being expressed in a form suitable for recognition by the DCU 2.

Next, the operation of the transceiver module in accordance with this embodiment of the present invention will be explained. When a certain error event occurs while the transceiver module 1 carries out a communications operation, the transceiver module writes an error flag indicating the occurrence of the error into either the LASI register (referred to as the PHY_LASI_Status register from here on) (i.e., the error flag register unit) in the XENPAK register group 8 of the PHY IC 3, or the LASI register (referred to as the DCU_LASI_Status register from here on) in the XENPAK register group 9a, which is implemented on the SRAM 9 via software in the DCU 2, according to the nature of the error.

For example, when a high-speed error which is detected only by the PHY IC 3 and which is associated with communications processing occurs, information about the error is recorded into the PHY_LASI_Status register included in the PHY IC 3, and, when a low-speed error which is detected only by the DCU 2 and which is associated with such processing as monitoring of the laser 14a for transmission occurs, information about the error is recorded into the DCU_LASI_Status register included in the DCU 2. Therefore, when these error recording operations are carried out, there is a contradiction between the contents of the PHY_LASI_Status register, and those of the DCU_LASI_Status register.

To solve this problem, when an error event associated with a high-speed error, the PHY IC 3 in accordance with this embodiment detects the error and sets an error bit corresponding to the error event to the PHY_LASI_Status register of the XENPAK register group 8, and simultaneously outputs a signal for notifying the occurrence of the error to outside the transceiver module.

To be more specific, the PHY IC 3 sends the PHY_LASI_Unmask signal 11 for causing the DCU 2 to generate an error signal in response to every error event to the DCU 2 without being controlled according to the value set to the PHY_LASI_Control register which functions as an error signal generating control register which prohibits the generation of any error signal in response to a specific error event. The PHY IC 3 also sends a normal error signal (referred to as a PHY_LASI_Normal signal from here on) (i.e., a third error signal) for prohibiting the DCU 2 from generating any error signal in response to a specific error event to the DCU 2 by way of the PHY_LASI_Control register. The PHY_LASI_Normal signal is a digital signal which specifies an error for which the generation of the LASI signal is controlled by the PHY_LASI_Control register.

At this time, the PHY_LASI_Unmask signal 11 from the PHY IC 3 is delivered to a not-shown external interruption terminal of the DCU 2 so that the DCU 2 can also detect the occurrence of an error event for which the DCU is prohibited from generating any error signal by the PHY IC 3. As a result, the DCU 2 outputs a secondary LASI signal 12 indicating the occurrence of the error to the host 4 so as to notify the error event to the host 4. The DCU 2 simultaneously copies the contents of the PHY_LASI_Status register of the PHY IC 3 to the DCU_LASI_Status register therein, which emulates the PHY_LASI_Status register, by way of an I2C interface 10.

It is assumed that the PHY IC 3 has a function of being able to access interrelated registers which are included in either the XENPAK register group 8 or at least the above-mentioned IEEE registers and XENPAK registers by way of the I2C interface 10.

The PHY IC 3 outputs both the PHY_LASI_Unmask signal 11 and PHY_LASI_Normal signal to the DCU 2, as previously mentioned. As an alternative, the PHY IC 3 outputs only the PHY_LASI_Unmask signal 11 to the DCU 2.

As mentioned above, in accordance with this embodiment 1, the transceiver module has both the PHY IC 3 having the XENPAK register group 8 including the PHY_LASI_Status register to which a bit value indicating the occurrence of an error, and the PHY_LASI_Control register to which a bit value indicating whether or not to generate an LASI signal 12 for notifying the host 4 of the occurrence of the error according to the nature of the error is set, and the DCU 2 having the XENPAK register group 9a which emulates the structure and function of the XENPAK register group 8. When detecting an error, the PHY IC 3 generates a PHY_LASI_Unmask signal 11 for causing the DCU 2 to generate the LASI signal 12 for any cause of errors irrespective of the value set to the PHY_LASI_Control register, i.e., for notifying the occurrence of the error to the DCU 2 irrespective of the cause of the error, and then outputs the PHY_LASI_Unmask signal 11 to the DCU 2, and the DCU 2 specifies the error detected by the PHY IC 3 based on the PHY_LASI_Unmask signal 11, generates the LASI signal 12 for the error, and then delivers the LASI signal 12 to the host 4. As a result, even when a high-speed error which is detected only by the PHY IC 3 occurs, the DCU 2 can know the occurrence of the error with the PHY_LASI_Unmask signal 11 without always monitoring the contents of the PHY_LASI_Control register included in the PHY IC 3. The transceiver module can thus make the contents of the DCU_LASI_Status register of the DCU 2 and those of the PHY_LASI_Status register of the PHY IC 3 match with each other, thereby preventing a contradiction from arising between the contents of these registers.

The DCU 2 checks to see whether an error event associated with either of the laser 14a for transmission and light detecting element 14b, which are monitored, has occurred. The DCU 2 can transmit an error signal (i.e., the secondary LASI signal 12), which it has generated, comprehensively, as well as other error signals (the PHY_LASI_Normal signal and PHY_LASI_Unmask signal 11) associated with communications processing from the PHY IC 3, to the host 4, at a higher layer.

Embodiment 2

Figure 2:
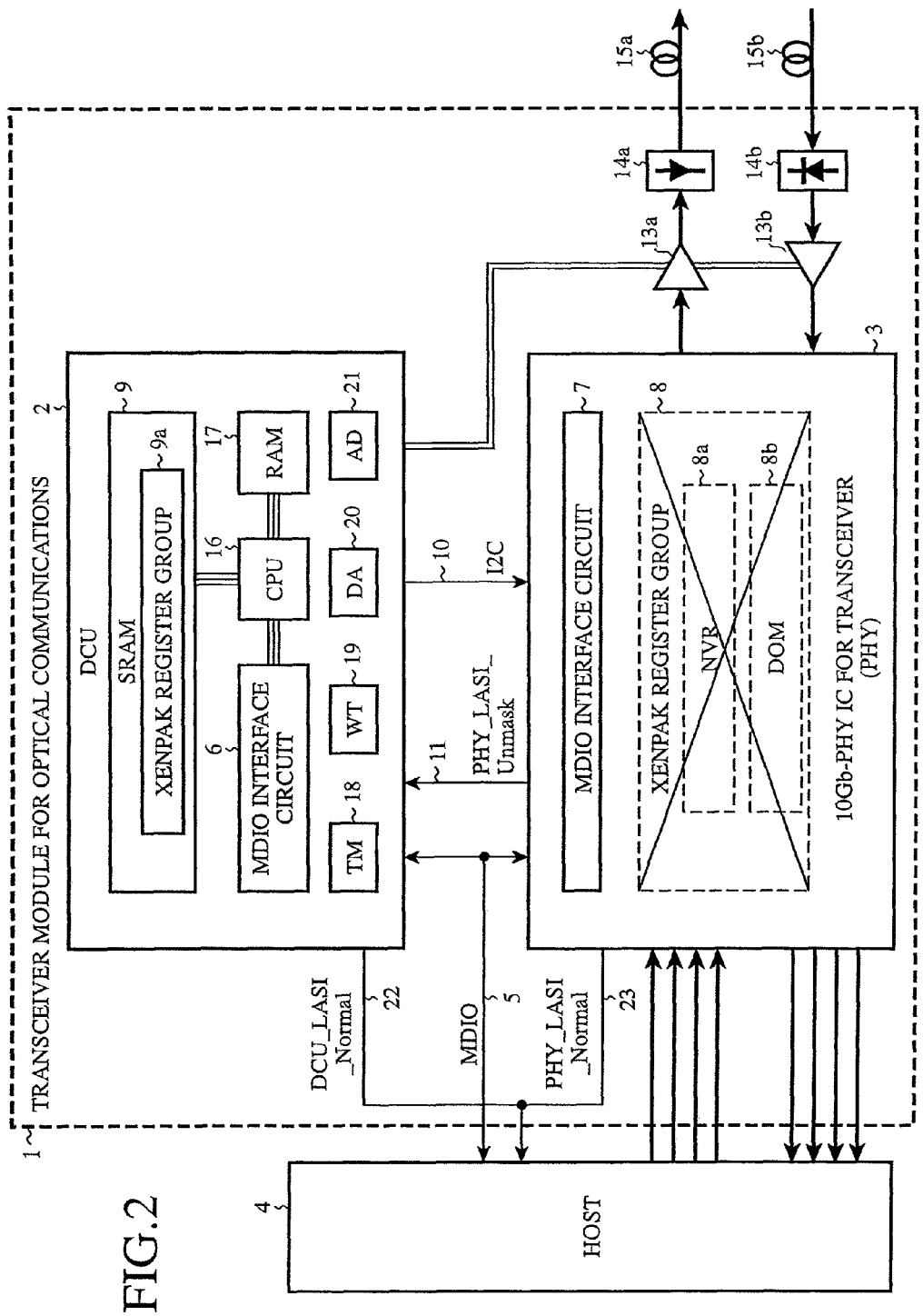
FIG. 2 is a diagram for explaining the structure of a transceiver module in accordance with embodiment 2 of the present invention, and alarm signal control processing carried out by the transceiver module.

FIG. 2 is a diagram for explaining the structure of a transceiver module in accordance with embodiment 2 of the present invention, and alarm signal control processing carried out by the transceiver module, and shows, as an example, an optical-communications transceiver module for 10 G-bit Ethernet (registered trademark) compliant with the IEEE802.3ae standard. The same components as those of FIG. 1, or like components are designated by the same reference numerals as shown in FIG. 1, and the duplicated explanation of these components will be omitted hereafter.

Although the transceiver module 1 in accordance with this embodiment has the same basic structure as that according to above-mentioned embodiment 1, the transceiver module 1 in accordance with this embodiment differs from that according to above-mentioned embodiment 1 in that a wired OR connection is established between a normal error signal (referred to as a DCU_LASI_Normal signal 22 from here on) (i.e., a fourth error signal) for prohibiting the generation of any error signal (i.e., a first error signal) with a DCU_LASI_Control register (not shown), and a normal error signal (referred to as a PHY_LASI_Normal signal 23 from here on) (i.e., a third error signal) for prohibiting the generation of any error signal with a PHY_LASI_Control register (not shown), and the result of a logical OR operation implemented on the DCU_LASI_Normal signal 22 and PHY_LASI_Normal signal 23 is an error signal (i.e., a first error signal) to be delivered to a host 4. The DCU_LASI_Normal signal 22 is a digital signal for specifying an error for which the generation of the LASI signal is controlled by the DCU_LASI_Control register which a DCU 2 emulates.

Also in FIG. 2, since an XENPAK register group 8 is software-emulated by the DCU 2, a PHY IC 3 has a mode in which it does not respond to access to the XENPAK register group 8 by way of an MDIO interface 5 from the host 4. In the illustrated example, in order to show that the PHY IC 3 is placed in the mode, the XENPAK register group 8 is enclosed by a dashed line, and a cross is added to the box of the XENPAK register group 8.

Next, the operation of the transceiver module in accordance with this embodiment of the present invention will be explained. When an error event occurs while the transceiver module 1 carries out a communications operation, the transceiver module writes an error flag indicating the occurrence of the error into either a PHY_LASI_Status register in the XENPAK register group 8 of the PHY IC 3, or a DCU_LASI_Status register in an XENPAK register group 9a, which is implemented on an SRAM 9 via software in the DCU 2, according to the nature of the error.

For example, when a high-speed error which is detected only by the PHY IC 3 and which is associated with communications processing occurs, information about the error is recorded into the PHY_LASI_Status register included in the PHY IC 3, whereas when a low-speed error which is detected only by the DCU 2 and which is associated with such processing as monitoring of a laser 14a for transmission occurs, information about the error is recorded into the DCU_LASI_Status register included in the DCU 2. Therefore, when these error recording operations are carried out, there is a contradiction between the contents of the PHY_LASI_Status register, and those of the DCU_LASI_Status register.

To solve this problem, when an error event associated with a high-speed error occurs, the PHY IC 3 in accordance with this embodiment detects the error and sets an error bit corresponding to the error event to the PHY_LASI_Status register of the XENPAK register group 8, and then outputs a signal for notifying the occurrence of the error to outside the transceiver module, like that of above-mentioned embodiment 1.

Like that of above-mentioned embodiment 1, the PHY IC 3 sends outs a PHY_LASI_Unmask signal (i.e., a second error signal) 11 for causing the DCU 2 to generate an error signal in response to every error event to the DCU 2 without being controlled by the PHY_LASI_Control register of the XENPAK register group 8. The PHY IC 3 also sends out a PHY_LASI_Normal signal (i.e., a third error signal) for prohibiting the DCU 2 to generate an error signal in response to a specific error event to the DCU 2 by way of the PHY_LASI_Control register.

At this time, the PHY_LASI_Unmask signal 11 from the PHY IC 3 is delivered to a not-shown external interruption terminal of the DCU 2 so that the DCU 2 can also detect the occurrence of an error event for which the DCU is prohibited from generating any error signal by the PHY IC 3. The DCU 2 simultaneously copies the contents of the PHY_LASI_Status register of the PHY IC 3 to the DCU_LASI_Status register therein, which emulates the PHY_LASI_Status register, by way of an I2C interface 10.

The DCU_LASI_Normal signal 22 which is sent out via the DCU_LASI_Control register and which is a normal error signal for prohibiting the generation of an error signal in response to a specific error event, and the PHY_LASI_Normal signal 23 which is sent out via the PHY_LASI_Control register and which is a normal error signal for prohibiting generation of an error signal in response to a specific error event are delivered, via a bus which wired-OR connects lines via which the DCU_LASI_Normal signal and PHY_LASI_Normal signal are passed through, to the host 4.

Therefore, a signal having the result of a logical OR operation implemented on digital values respectively indicated by the PHY_LASI_Normal signal 23 and DCU_LASI_Normal signal 22 is delivered, as an LASI signal indicating the occurrence of the error, to the host 4. As a result, even if an error occurs in either the DCU 2 or PHY IC 3, the host 4 can know the occurrence of the error from the result of a logical OR operation implemented on the PHY_LASI_Normal signal 23 and DCU_LASI_Normal signal 22.

As mentioned above, in accordance with this embodiment 2, the PHY IC 3 outputs the PHY_LASI_Normal signal specifying an error for which the generation of the LASI signal is controlled according to the value set to the PHY_LASI_Control register, and the DCU2 outputs the DCU_LASI_Normal signal specifying an error for which the generation of the LASI signal is controlled according to the value set to the DCU_LASI_Control register of the XENPAK register group 9a which emulates the XENPAK register group 8, as well as an error which the DCU 2 specifies based on the PHY_LASI_Unmask signal 11 and which is detected by the PHY IC 3, and the transceiver delivers the result of a logical OR operation implemented on digital values respectively indicated by the PHY_LASI_Normal signal and DCU_LASI_Normal signal respectively outputted from the PHY IC 3 and DCU 2, as the LASI signal, to the host 4. Therefore, the transceiver can transmit both an error event associated with a low-speed operation which is detected by the DCU 2, and an error event associated with a high-speed operation which is detected by the PHY IC 3 to the host 4 at a high speed, thereby increasing the speed of response of the whole of the system.

Embodiment 3

FIG. 3 is a diagram for explaining the structure of a transceiver module in accordance with embodiment 3 of the present invention, and alarm signal control processing carried out by the transceiver module, and shows, as an example, an optical-communications transceiver module for 10 G-bit Ethernet (registered trademark) compliant with the IEEE802.3ae standard. Although the transceiver module 1 in accordance with this embodiment has the same basic structure as that according to above-mentioned embodiment 1, the transceiver module 1 in accordance with this embodiment differs from that according to above-mentioned embodiment 1 in that a PHY IC 3 transmits an LASI signal to a host 4. The same components as those of FIG. 1, or like components are designated by the same reference numerals as shown in FIG. 1, and the duplicated explanation of these components will be omitted hereafter.

In addition, also in FIG. 3, since an XENPAK register group 8 is software-emulated by a DCU 2, the PHY IC 3 has a mode in which it does not respond to access to the XENPAK register group 8 via an MDIO interface 5 from the host 4. In the illustrated example, in order to show that the PHY IC 3 is placed in the mode, the XENPAK register group 8 is enclosed by a dashed line, and a cross is added to the box of the XENPAK register group 8.

Next, the operation of the transceiver module in accordance with this embodiment of the present invention will be explained. When an error event occurs while the transceiver module 1 carries out a communications operation, the transceiver module writes an error flag indicating the occurrence of the error into either a PHY_LASI_Status register in the XENPAK register group 8 of the PHY IC 3, or a DCU_LASI_Status register in an XENPAK register group 9a, which is implemented on an SRAM 9 via software in the DCU 2, according to the nature of the error.

For example, when a high-speed error which is detected only by the PHY IC 3 and which is associated with communications processing occurs, information about the error is recorded into the PHY_LASI_Status register included in the PHY IC 3, whereas when a low-speed error which is detected only by the DCU 2 and which is associated with such processing as monitoring of a laser 14a for transmission occurs, information about the error is recorded into the DCU_LASI_Status register included in the DCU 2. Therefore, when these error recording operations are carried out, there causes a contradiction between the contents of the PHY_LASI_Status register, and those of the DCU_LASI_Status register.

To solve this problem, when an error event associated with a low-speed error which the DCU 2 in accordance with this embodiment monitors occurs, the DCU 2 writes an error bit corresponding to the error event to the PHY_LASI_Status register of the XENPAK register group 8 in the PHYIC3 via an I2C interface 10.

On the other hand, when an error event associated with a high-speed error, the PHY IC 3 in accordance with this embodiment detects the error and sets an error bit corresponding to the error event to the PHY_LASI_Status register of the XENPAK register group 8, and simultaneously outputs a signal for notifying the occurrence of the error to outside the transceiver module.

To be more specific, the PHYIC3 delivers a PHY_LASI_Normal signal having a value according to the contents of the PHY_LASI_Status register of the XENPAK register group 8 into which an error bit is written by the DCU 2 and those of the PHY_LASI_Control register, as an LASI signal (i.e., a first error signal) 12, to the host 4.

As mentioned above, in accordance with this embodiment 3, the transceiver module has the PHY IC 3 having the XENPAK register group 8 including the PHY_LASI_Status register to which a bit value indicating the occurrence of an error is set, and the DCU2 having the XENPAK register group 9a which emulates the XENPAK register group 8, and the DCU 2 writes a bit value specifying the occurrence of the error, which is set to the DCU_LASI_Status register of the XENPAK register group 9a which emulates the XENPAK register group 8, into the PHY_LASI_Status register of the PHY IC 3 and the PHY IC 3 generates an LASI signal 12 for notifying the occurrence of the error specified by the value set to the PHY_LASI_Status register to the host 4 and then delivers the LASI signal 12 to the host 4. As a result, when a high-speed error which is detected only by the PHYIC3 occurs, the DCU 2 can know the occurrence of the error without always monitoring the contents of the PHY_LASI_Control register included in the PHY IC 3. The transceiver module can thus make the contents of the DCU_LASI_Status register of the DCU 2 and those of the PHY_LASI_Status register of the PHY IC 3 match with each other, thereby preventing a contradiction from arising between the contents of these registers.

The PHY IC 3 can manage an error event associated with communications processing which it monitors, as well as the error which is detected by the DCU 2, and can therefore transmit an error signal (i.e., an LASI signal 12) which it has generated comprehensively to the host 4 at a higher layer.

A variant having the following structure can be made in above-mentioned embodiment 3. For all error events which the DCU 2 monitors and which are not controlled by the DCU_LASI_Control register (not shown) of the XENPAK register group 9a corresponding to the PHY_LASI_Control register of the XENPAK register group 8, the DCU 2 delivers either both a DCU_LASI_Unmask signal (i.e., an error signal which the DCU generates by bypassing the DCU_LASI_Control register) (i.e., a fifth error signal) for causing the PHY IC 3 to generate an error signal (i.e., a first error signal), and a normal error signal (referred to as a DCU_LASI_Normal signal from here on) (i.e., a sixth error signal) for prohibiting the PHY IC 3 from generating an error signal for a specific error event, or only the DCU_LASI_Unmask signal, by way of the DCU_LASI_Control register, to the PHY IC 3. The PHY IC 3 simultaneously copies the contents of the DCU_LASI_Status register of the DCU 2 to the PHY_LASI_Status register by way of the I2C interface 10.

The DCU_LASI_Unmask signal is a signal having a digital value for notifying and specifying the error detected by the DCU 2 irrespective of the contents of the DCU_LASI_Control register, that is, irrespective of the cause of the error, the digital value being expressed in a form suitable for recognition by the PHY IC 3. The DCU_LASI_Normal signal is a digital signal for specifying an error for which the generation of the LASI signal is controlled by the DCU_LASI_Control register.

As a result, the PHY IC 3 can also detect the occurrence of an error event which is detected only by the DCU 2 and for which the generation of any error signal is prohibited by the PHY IC 3 from the DCU_LASI_Unmask signal delivered thereto from the DCU 2. The PHY IC 3 can therefore output a secondary LASI signal 12 about the error to the host 4, and can notify the occurrence of the error event to the host 4.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of controlling a transceiver module which includes a physical-layer integrated circuit having a physical-layer register unit, and a control integrated circuit having a control-side register unit, the method comprising:

emulating the physical-layer register unit with the control-side register unit;

prohibiting generation of a first error signal by the physical-layer integrated circuit, the first error signal giving notice of detection of a specific error directly to a higher-layer device;

outputting a second error signal from the physical-layer integrated circuit, the second error signal giving notice of a high-speed error associated with communication processing and detected by the physical-layer integrated circuit, to the control integrated circuit; and specifying, by the control integrated circuit, the high-speed error in response to the outputting of the second error signal;

setting a bit in the control-side register unit in response to the specifying of a high speed error by the control integrated circuit; and delivering, by the control integrated circuit, to the higher-layer device, as the first error signal, the second error signal specifying detection of a high-speed error.

2. The method according to claim 1 comprising:

outputting by the physical-layer integrated circuit to the control integrated circuit a third error signal, the third error signal specifying detection of the high-speed error; and specifying, by the control integrated circuit, detection of a high-speed error based upon the second and third error signals.

3. The method according to claim 1, comprising:

outputting by the physical layer integrated circuit of a third error signal specifying detection of a high-speed error;

prohibiting generation of a first error signal by the control integrated circuit, the first error signal giving notice of detection of a specific error directly to a higher-layer device;

outputting of a fourth error signal by the control integrated circuit, the fourth error signal specifying a low-speed error, if the low-speed error is detected by the control integrated circuit; and delivering the result of a logical OR operation on digital values indicated by the third and fourth error signals to the higher-layer device, as the first error signal.

* * * * *